(12) United States Patent
Chowaniec et al.

(10) Patent No.: US 6,623,254 B2
(45) Date of Patent: Sep. 23, 2003

(54) HIGH PRESSURE WATER PUMP

(75) Inventors: James M. Chowaniec, Cape Coral, FL (US); Larry E. Drummond, Cape Coral, FL (US)

(73) Assignee: Munters Corporation, Fort Myers, FL (US)

( * ) Notice: Subject to any disclaimer, the term of this patent is extended or adjusted under 35 U.S.C. 154(b) by 17 days.

(21) Appl. No.: 10/046,168

(22) Filed: Jan. 16, 2002

(65) Prior Publication Data

US 2002/0106292 A1 Aug. 8, 2002

Related U.S. Application Data

(60) Provisional application No. 60/262,393, filed on Jan. 19, 2001.

(51) Int. Cl.[7] .......................... F04B 17/00; F04B 35/00; F02G 7/00; F02G 1/00; F02G 5/00
(52) U.S. Cl. .................. 417/403; 417/404; 417/533; 417/539; 60/39.53
(58) Field of Search ................. 417/403, 404, 417/533, 539; 60/39.53

(56) References Cited

U.S. PATENT DOCUMENTS

| | | | | |
|---|---|---|---|---|
| 5,013,198 A | * | 5/1991 | Schultz | 417/287 |
| 6,267,571 B1 | * | 7/2001 | Anderson et al. | 417/539 |
| 6,299,416 B1 | * | 10/2001 | Kwag | 417/403 |

* cited by examiner

Primary Examiner—Charles G. Freay
Assistant Examiner—William H. Rodriquez
(74) Attorney, Agent, or Firm—Fitzpatrick, Cella, Harper & Scinto

(57) ABSTRACT

A high-pressure water pump for supplying high pressure water for atomization in the inlet stream of a gas turbine is disclosed which includes at least one hydraulic cylinder containing a piston secured to a piston rod extending from the hydraulic cylinder and defining within the hydraulic cylinder first and second hydraulic chambers on opposite sides thereof, hydraulic oil pump and solenoid valve for selectively supplying oil under high pressure alternately to said hydraulic chambers while releasing oil from the opposite chamber thereby to reciprocate said piston rod, and at least one water cylinder including a housing and a piston therein secured to the piston rod for movement therewith and defining at least one fluid chamber in the cylinder on the side of thereof opposite the piston rod; and check valves in fluid communication with said fluid chamber for allowing water to enter the chamber from a water source when the piston in the water cylinder is moved by the hydraulic cylinder in a direction which enlarges the volume of the fluid chamber and forces water from the fluid chamber at high pressure, while shutting off the supply of water to the chamber, when the piston in the water cylinder is moved by the hydraulic cylinder in a direction that decreases the volume of said fluid chamber.

12 Claims, 4 Drawing Sheets

HIGH PRESSURE WATER PUMP

BACKGROUND OF THE INVENTION

This application claims benefit of 60/262,393 Jan. 19, 2001.

FIELD OF THE INVENTION

The present invention relates generally to apparatus and methods for producing pressurized water, and more particularly to a high-pressure water pump for supplying high pressure water to an evaporative cooling apparatus and particularly to so-called fogging nozzles for cooling the inlet air of a gas-turbine generator.

DESCRIPTION OF THE PRIOR ART

Existing fogging systems for evaporative coolers utilize crankshaft based reciprocating piston or gear type water pumps to create high pressure water (1500 to 3000 psi) which is atomized by known forms of fogging nozzles in the inlet airstream of a gas turbine to cool the inlet air. High pressure water is required to achieve the small droplet sizes needed to insure that the droplets completely evaporate prior to their entrance into the turbine inlet.

In gas turbine fogging systems it is common to use de-ionized water to prevent mineral contamination downstream and on turbine parts; thus all coated components, including the pump, must be of stainless steel and exotic seal materials. This type of equipment calls for maintenance on weekly intervals. Moreover, only a limited number of suppliers produce reliable high pressure de-ionized water pumps. Due to this limited supply and the nature of the materials required to make these pumps they are quite expensive.

Moreover, with the prior art pumping systems, in order to achieve volume control, pressure relief valves are used to redirect water back to the pump. This causes heating of the water which reduces its evaporative efficiency and increases pump wear.

For large systems, and in order to vary the water volume, several pumps are required and the water not used immediately will be recirculated from the pressure side of the pump(s) back to the pump inlet. To have several pumps providing a required volume of high pressure water plus control mechanisms adds further to the water temperature, since some of the energy driving the pump inevitably gets added to the water. The water temperature will thus rise well above the wet bulb temperature, further decreasing the cooling efficiency of the water.

SUMMARY OF THE INVENTION

The present invention presents new and unique methods and apparatus for providing a constant high pressure water stream to the atomizing spray nozzles used for evaporative cooling of the inlet air of a gas-turbine generator.

In accordance with an aspect of the present invention, a hydraulic pump system is provided with a variable stroke, axial piston pump (or other variable volume pump) which supplies a high pressure oil flow to drive one or more hydraulic cylinders which in turn drive pistons in one or more water cylinders to pressurize water and supply it to the spray or fogging nozzles.

The water cylinders may be of single or double acting type and produce water pressure between 0–10,000 psi, and preferably between 1000-5000 psi.

An advantage of the present invention is that the system maintains a substantially constant water pressure range as the volume varies from zero to maximum water flow. Moreover, the power consumed by the hydraulic pump varies directly with the output of the pump.

Another advantage of the present invention is that the efficiency of the hydraulic water pump system at full flow is equal to or better than prior art devices, and increases at reduced flow.

Yet another advantage of the present invention is that staging does not require multiple hydraulic systems and controls. The output of one large hydraulic system can be divided into as many stages as required. Backup systems may be also used as a redundancy measure.

The present invention includes the ability to vary the amount of water fogged into the air stream using as many stages as desired, there being theoretically no limit to the number of stages used. The stages are created using valves, and provide the coarse adjustment of the humidification. The pressure output of the hydraulic pump is varied over a preset range to vary the volume of water delivered. This can be controlled by a programmable logic controller (PLC) through a milliamp output based on the difference between the wet bulb and dry bulb temperatures of the ambient air.

In atomizing spray evaporative cooling systems used to improve operations of gas turbines, the amount of water to be sprayed into the air must be tightly regulated in order to achieve maximum efficiency. First the air temperature, humidity and barometric pressure are measured. Second the saturation water content of air at the measured temperature and pressure is calculated by known means. The difference between the ambient humidity and the saturation humidity is the maximum amount of water which may be evaporated into the air stream. As a result, the flow of water must be set as close to this value as possible in order to achieve the maximum cooling and thus maximum increase in turbine output performance. Alternately, additional water may be added to the air stream in order to provide inter-cooling for the turbine. In either case, the precise amount of water to be added is determined empirically, and must be closely controlled.

The hydraulic system of the present invention is inherently a variable volume device. Thus the water flow rate can be set by simply selecting the number of spray heads to be activated and the outlet pressure supplied by the water cylinders. However, the system allows fine tuning of the water flow through adjustment of the water pressure, which is easily achieved through adjusting the hydraulic pressure using standard pressure control techniques (e.g., proportion flow control devices on the hydraulic oil lines, pump speed control, or pressure relief control, etc.). Moreover, by utilizing hydraulic oil pumps, not only is reliability and durability significantly improved, but cost of components is significantly reduced.

A high-pressure water pump in accordance with the present invention for supplying high pressure water to the fogging or atomizing nozzles used to cool inlet air for a gas-turbine generator includes a first hydraulic oil cylinder having a piston and a connecting rod having a first end attached to one side of the piston. The connecting rod includes a second end protruding out a first end of the cylinder. The hydraulic cylinder also includes a first port arranged adjacent the first end of the cylinder in fluid communication with a first port of a solenoid valve, and a second port arranged adjacent a second end of the cylinder in fluid communication with a second port of the solenoid valve. The solenoid valve is in fluid communication with the high pressure line of a hydraulic oil pump and a return line of said hydraulic oil pump. The pump according to this aspect of the invention also includes a first water cylinder having a piston attached on one side to a second end of the connecting rod, with the second end of the connecting rod entering the cylinder through an opening in the first end of the water cylinder. In one embodiment the water cylinder is a single action cylinder having a first port arranged adjacent the first end of the water cylinder in fluid communication with a first check valve for allowing low pressure water to enter the cylinder, and a second, oppositely acting check valve connected to a second port for allowing water to be forced out of the second port by the piston and enter a high pressure water line. In another embodiment the water cylinder may be a double action cylinder capable of pumping water alternately from opposite ends under the control of appropriately arranged check valves.

In another aspect of the present invention, the above high-pressure water pump further includes pairs of hydraulic and water cylinders working together.

DETAILED DESCRIPTION OF THE PREFERRED EMBODIMENTS

Figure 1:
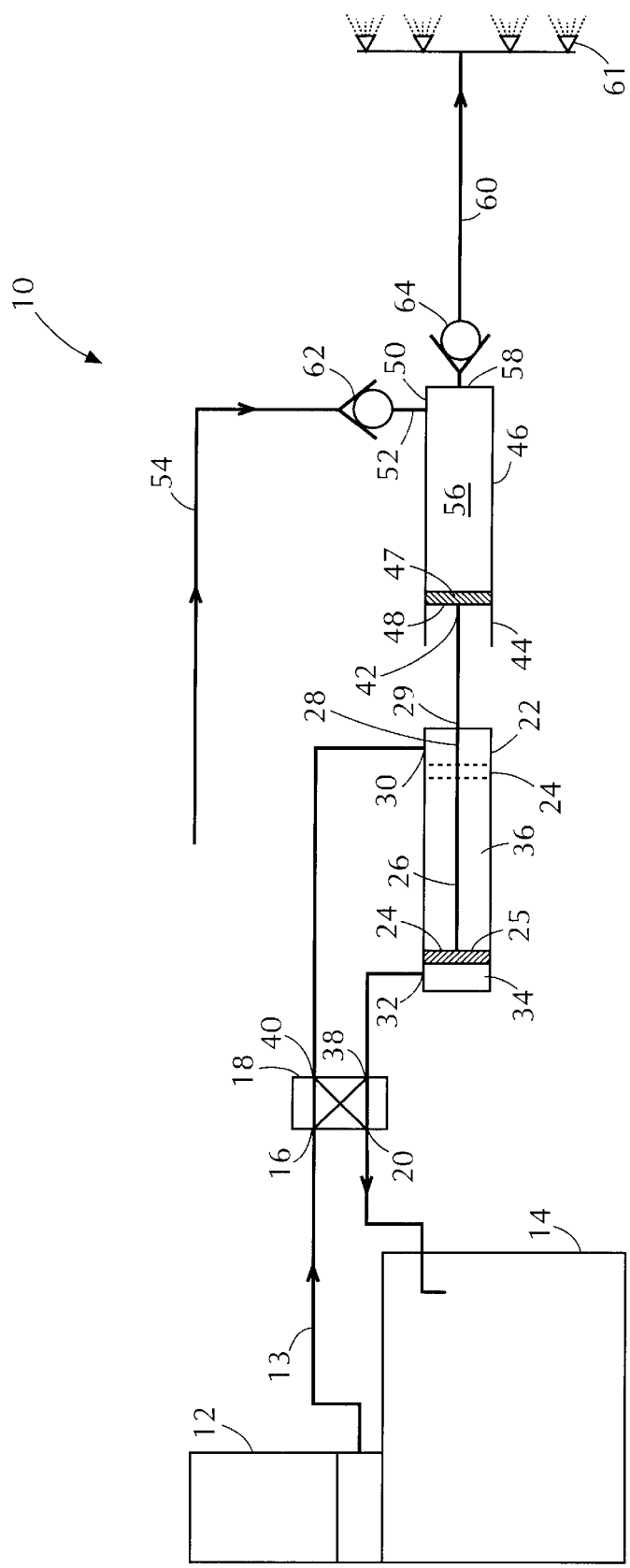
FIG. 1 is a schematic view of a first embodiment of a hydraulic water pump system according to the present invention.

FIG. 1 illustrates a first embodiment of a high pressure pump 10 according to the present invention and is the basis for each of the other embodiments described below.

High pressure pump 10 includes a conventional hydraulic oil pump 12 which receives or draws hydraulic oil from a hydraulic oil reservoir 14, and pumps it at high pressure to a first port 16 on a hydraulic control valve 18 which preferably is a two-way solenoid valve. Oil is returned to reservoir 14 through valve 18 and its second or return port 20.

Pump 10 also includes a hydraulic cylinder 22 which consists of a cylindrical housing having a piston 24 positioned therein. The piston is secured in any conventional manner on one side 25 to an end 26 of a connecting or piston rod 28 that passes out of the end 29 of housing 22.

Hydraulic oil pump 12 may be of conventional construction including appropriate filtration and control mechanisms to produce high pressure oil at between 500 to 3000 psi through its supply line 13.

Cylinder housing 22 includes ports 30, 32 for receiving and/or expelling hydraulic oil from the chambers 34, 36 on opposite sides of piston 24 in response to the actuation of solenoid valve 18.

Hydraulic oil is directed by solenoid valve 18 from port 16 to one of the ports 30, 32 on either end of hydraulic cylinder 22 based upon the stroke or position of the piston 24. That is, once piston 24 has reached the end of a stroke, for example, as shown in FIG. 1, solenoid valve 18 is actuated to connect port 16 to port 38 and thereby allow high pressure hydraulic oil to flow to chamber 34 driving piston 24 and rod 28 to the right. As high pressure hydraulic oil flows into chamber 34 hydraulic oil in chamber 36 is forced out of the cylinder by the advancing piston via port 30 to the port 40 on valve 18 and returns to a hydraulic oil reservoir via solenoid valve port 20. When piston 24 reaches the end of its stroke to the right (shown in dotted lines) valve 18 is actuated to connect port 16 to port 40 and port 20 to port 38 so the flow of oil to and from cylinder 22 is reversed. The operation of the control valve 18 with respect to the position of piston 24 is accomplished in any convenient manner as would be apparent to those skilled in the art such as, for example, by an electronic timer apparatus, appropriate electronic sensors, or a programmable logic controller (PLC).

The end 42 of piston rod 28 which protrudes from hydraulic cylinder 22 enters one end 44 of a water cylinder 46. The water cylinder includes a piston 47 therein connected on a first side 48 thereof to the end 42 of the piston rod 28. Water cylinder 46 is positioned in-line, along a central axis, with hydraulic oil cylinder 22, with the piston of each cylinder being positioned in substantially the same location in each respective cylinder. As a result, the stroke of piston 47 in water cylinder 46 from one end to the other is substantially identical to the stroke of piston 24 in hydraulic cylinder 22. Thus, when piston 24 of hydraulic oil cylinder 22 is located at the first end of the hydraulic cylinder as shown in FIG. 1, piston 47 in water cylinder 46 is located at the corresponding first end of that cylinder as well.

The opposite or second end 50 of water cylinder 46 has a first port 52 formed therein for receiving water from a low pressure source through a supply line 54. The water is drawn into the chamber 56 of cylinder 46 when its piston 47 is pulled away from the end 50 as piston 24 is moved from its dotted line position in FIG. 1 to its solid line position. Alternatively, or in addition, water may enter the port by pressure provided by the water source.

The end 50 of water cylinder 46, has a second port to eject water from chamber 56 of cylinder 46 at high pressure as a result of piston 47 pushing water out of the chamber through the second port to a discharge line 60 when the piston 24 is moved from its solid line position in FIG. 1 to its dotted line position.

The water supply and discharge lines 54, 60 each have a one way check valve 62, 64 of conventional construction respectively located therein to control water flow to and from chamber 56 in response to the pressure of water in the chamber resulting from movement of the piston 47. The one-way check valves are arranged such that checkvalve 62 associated with first port 52 allows water only to flow into cylinder chamber 56 when the pressure in the chamber is less than the pressure in line 54 and the set actuation pressure of the valve, while checkvalve 64 associated with second port 58 allows water only to flow out of the cylinder when the pressure in chamber 56 is greater than the actuation pressure of the valve.

Of course, one skilled in the art will appreciate that a single port located on the end 50 of the cylinder 46 also may be used for water flowing into or out of the cylinder. In such an arrangement, the single port would be connected to a first line having a checkvalve which would allow water to only flow from the water line directly into the port. The port would also be connected to a second, high pressure line having a checkvalve which would only allow high pressure water to flow into the high pressure line from the port.

Accordingly, water pump 10 operates as follows. For demonstrative purposes, pump 10 will be described in an initial condition with the pistons 24, 47 of the cylinders being positioned at the first end of each respective cylinder 22, 46, as shown in FIG. 1. In that condition the chamber 36 is filled with hydraulic fluid and the chamber 56 of the water cylinder is filled with water.

As described above, both cylinders are of substantially the same length and have substantially the same stroke, with the pistons being positioned in substantially the same positions throughout the stroke.

In this starting position solenoid valve 18 is actuated to put ports 16 and 38 thereof in communication to supply high pressure hydraulic oil from hydraulic oil pump 12 to chamber 34 of hydraulic cylinder 22. As hydraulic oil fills chamber 34, piston 24 is forced toward the opposite or second end of cylinder 22 thereby forcing hydraulic oil from chamber 36 out of the second end through port 30. The solenoid valve 18 directs the return oil forced out chamber 36 from port 40 to port 20 and thus to hydraulic oil reservoir 14.

Movement of piston 24 in this way causes piston 47 of water cylinder 46 to move away from end 44 in the same direction since connecting rod 28 connects the two pistons. Thus, water in chamber 56, between piston 47 and the second end 50 of water cylinder 46, is forced out of port 58 at high pressure through check valve 64.

The high pressure water may then be directed to any intended destination. For example, the high pressure water may be directed via a high pressure water line 60 to a manifold for discharge through fogging or spray nozzles 61 supplying cooled and humidified water droplets to a gas turbine.

Typically, the spray nozzles are selected to atomize water into droplets with a mean diameter as low as possible not exceeding 25 microns. The diameters of the cylinders 22 and 46 can be selected so that the ratio of their diameters results in cylinder 46 providing water of the desired pressure to achieve those atomization characteristics with the nozzles. Using commercially available nozzles this means cylinder 46 should produce water at a pressure of from 1500 to 4000 psi.

When piston 26 in hydraulic oil cylinder 22 reaches the opposite end of the cylinder, i.e., the end of its stroke shown in dotted lines in FIG. 1, the solenoid valve is actuated by a PLC as described above to redirect the high pressure hydraulic oil from pump 12 through port valve port 40 to the port 30 of hydraulic cylinder 22 and into chamber 36. This forces piston 24 back toward its solid line position at the first end of the cylinder and thereby forces piston 47 in water cylinder 46 back toward the first end of the water cylinder and the position shown in FIG. 1. As this happens oil in chamber 34 returns to reservoir 14 through ports 32, 38 and 20, while water from line 54 is drawn through check valve 62 into chamber 56 of cylinder 46 at a lower pressure than the pressure of the water pumped out by movement of the piston on the opposite direction in the prior step, while at the same time check valve 64 is closed to keep the water on the pressure side from entering into chamber 56 of water cylinder 46.

Figure 2:
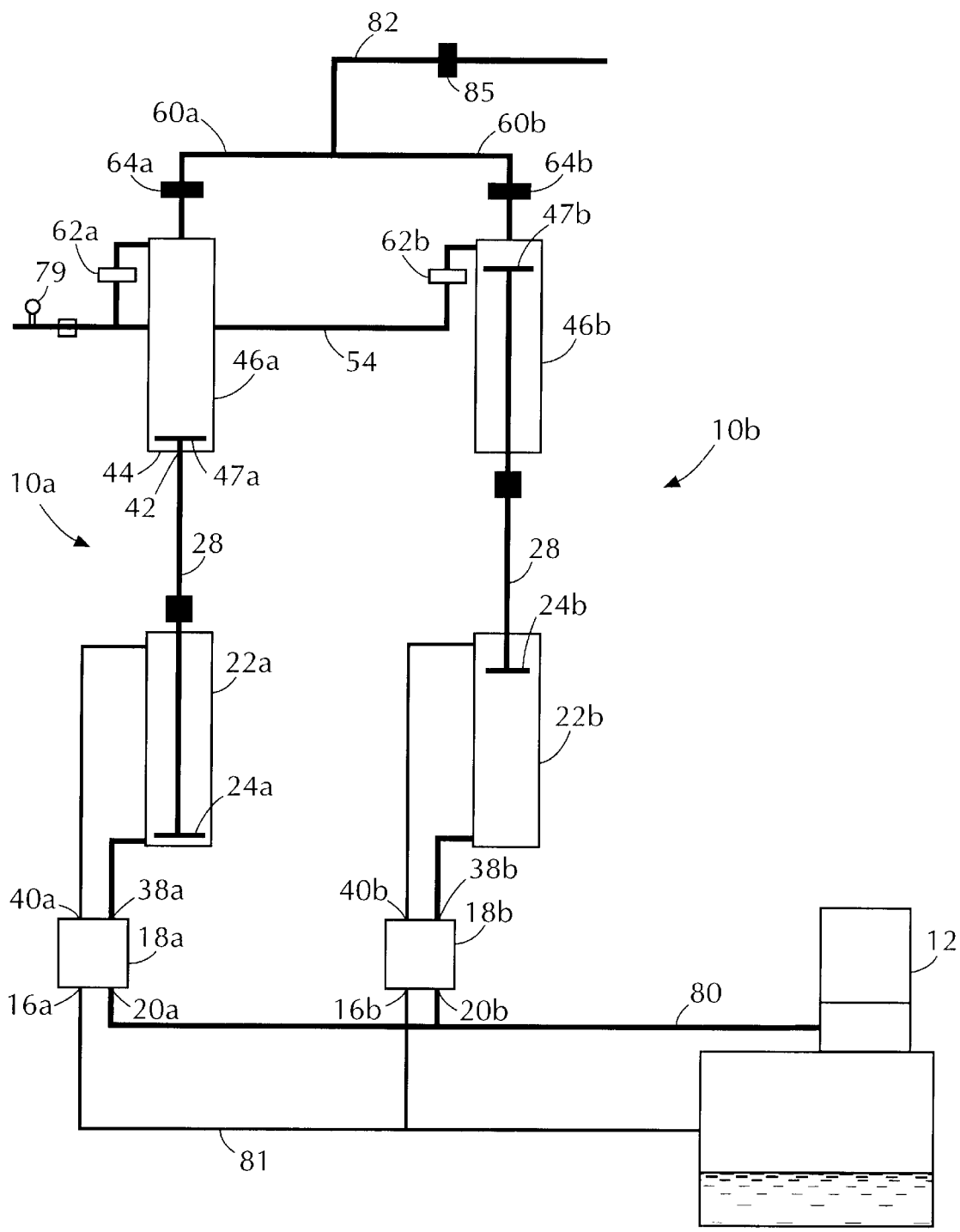
FIG. 2 is a schematic view of a second embodiment of a hydraulic water pump system according to the present invention.

In a second embodiment of the invention, illustrated schematically in FIG. 2, a pair of hydraulic water pumps 10, as described above, are arranged side by side and wherein like numerals are applied to like parts. In this embodiment, the pistons 24a, 47a of the hydraulic and water cylinders 22a, 46a of one pump 10a are arranged to move in an opposite direction from the pistons 24b, 47b in the hydraulic and water pumps 22b, 46b of the other pump 10b. Thus, as seen in FIG. 2 when the pistons 24a, 47a of pump 10a are positioned at the first end of each respective cylinder corresponding to the position shown in solid lines in FIG. 1, the pistons 24b, 47b of pump 10b are positioned at the second or opposite ends of their respective cylinders.

Although, in principal, the system would operate satisfactorily with the pistons 47a and 47b 180° out of phase and always moving in opposite directions, preferably, as seen in FIG. 2, these pistons are arranged (or controlled through the PLC and appropriate pressure control devices in the lines supplying hydraulic fluid to cylinders 22 and 27) to be slightly out of phase so that water from one or both pistons is always being supplied to the manifold 82. This avoids the drop in water pressure in the manifold that may occur if both pistons reverse directions at precisely the same time.

In this embodiment, a single hydraulic oil pump 12 and reservoir 14 are used to supply and receive hydraulic oil to and from pump 10a and 10b. High pressure oil is sent from pump 12 to two solenoid valves 18a and 18b associated with pumps 10a and 10b through line 81. Oil is returned from the solenoids 18a and 18b through the line 81. The solenoids 18a and 18b are set to control the cylinders so they are out of phase; thus one of the pumps 10a or 10b will be operating its associated water cylinder 46a or 46b to supply high pressure water to its associated outlet line 60a or 60b, while the other pump is operating (slightly out of phase) in the reverse direction to draw water from the supply line 54 into the chamber 56 of its associated water cylinder. As seen in FIG. 2 a low pressure water switch or sensor 79 is provided in supply line 54 to monitor the water supply line pressure. The sensor is used to ensure that supply pressure is sufficiently high as to avoid cavitation in the inlet water supply line while water is being drawn into the cylinder.

Water outlet lines 60a and 60b join to form a single output line or manifold 82 that supplies the high pressure water to the evaporative cooling fogging nozzles. This line includes a high water pressure switch or sensor 85 which monitors the pressure in the supply line and the output of the water cylinder to prevent overpressure conditions. In a preferred embodiment this may be a linear pressure sensor which may be used to monitor the output water pressure and supply that information to the PLC which will then control supply of oil to the hydraulic cylinder in a manner to keep the pressure in line 85 at the desired constant level. This produces a constant, steady stream of high pressure water emanating from the overall pump.

Figure 3:
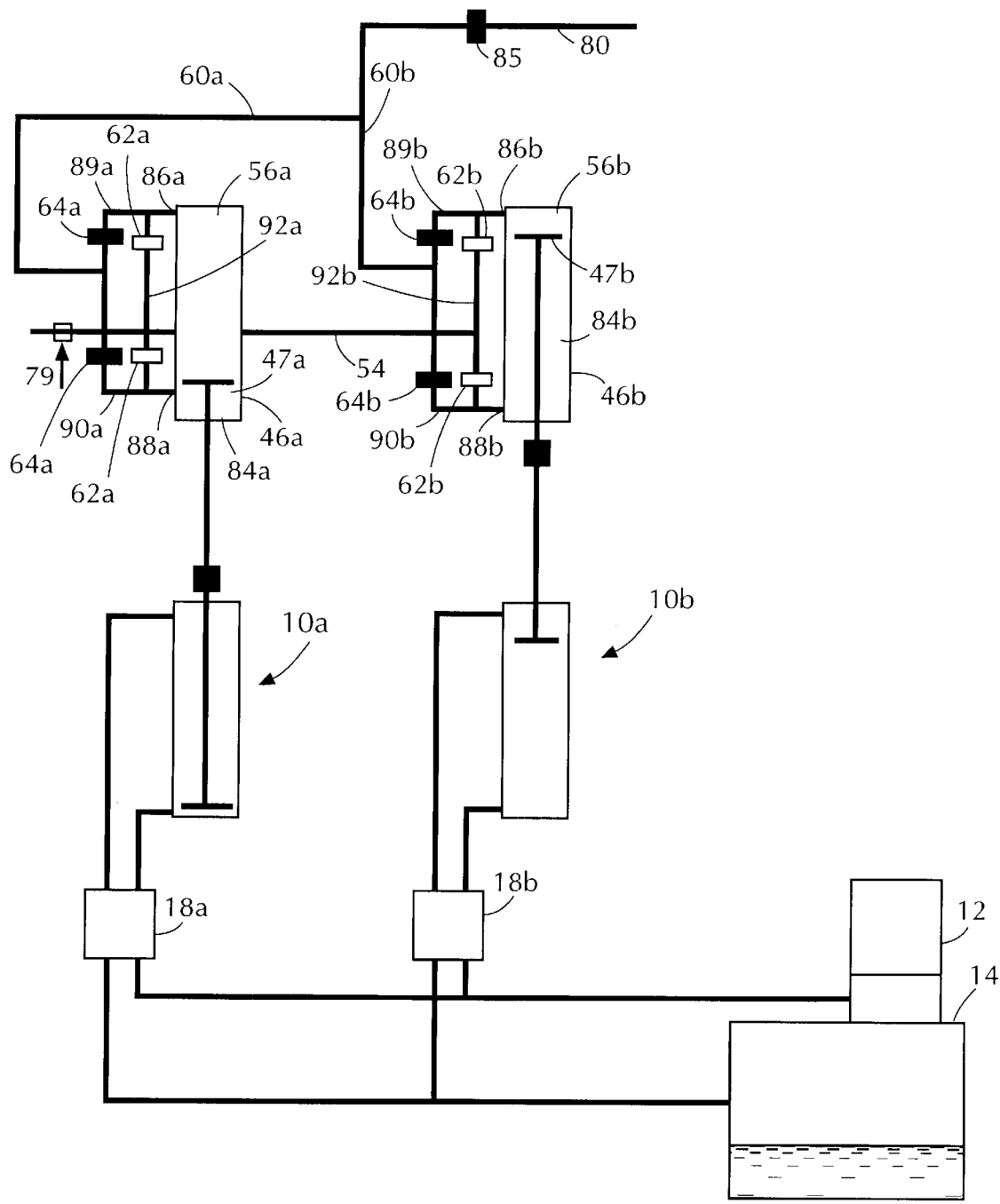
FIG. 3 is a schematic view of a third embodiment of a hydraulic water pump system according to the present invention.

In a third embodiment of the present invention, as illustrated in FIG. 3, a pair of water pumps 10a, 10b similarly arranged to the second embodiment are provided; here again like numerals are used to designate like parts. However, in this case water cylinders 46a and 46b are double acting cylinders closed at both ends so that their pistons 47a, 47b define two water chambers 56a, 84a and 56b, 84b on opposite sides thereof respectively. In addition, instead of the ports 50, 58 being located at one end of the water cylinder (as shown in FIG. 1), separate ports 86, 88 are located at opposite ends of each cylinder respectively communicating with chambers 56, 84. Each of these ports is connected by a line 89, 90 through check valves 64 to high pressure water lines 60a, 60b, which join to direct high pressure water through manifold 80 to the fogging nozzles. The ports 86, 88 are also connected to the low pressure water supply line 54 by check valves 62 positioned in manifolds 92 which connect lines 89, 90. This allows water to flow into the cylinder from the low pressure line only, and water to flow out of the cylinder into the high pressure water line only.

Accordingly, in the third embodiment, high pressure water is provided on both strokes of each water cylinder i.e., in both the forward and reverse strokes. Thus, twice the volume of high pressure water is provided.

As will be understood by those skilled in the art this arrangement can be multiplied as desired so that any particular volume of high pressure water may be obtained by adding an appropriate number of additional pumps and/or pumping systems.

In addition to the above, the system of the present invention has the ability to infinitely vary the amount of water fogged into the air stream using relatively few stages with infinite modulation between stages. The stages can be created by using shutoff valves with the nozzles so that a coarse adjustment of humidification is made by controlling the number of nozzles used. Finer adjustments can be made by varying the pressure outputs of the hydraulic pump which will thereby vary the volume of water supplied in each stage. This can be done by using a programmable logic controller and appropriate temperature sensors to determine the differences in wet bulb temperature and dry bulb temperature of the inlet air so that the amount of moisture needed to saturate the inlet air can be calculated and used by the PLC to control oil pressure or, stroke length or the speed of a stroke. For example, once the PLC calculates the amount of water required to be supplied to the turbine, it selects the number of stages to be operated which is at least one greater than required. It then monitors the output water pressure in line 80 through a linear pressure transducer or the like and adjusts the pressure of oil supplied to the hydraulic cylinders through proportional control devices so the resulting water output pressure in line 80 produces the required water flow rate. Thus the pressure and volume of the water ejected from the pump attains predetermined values.

Figure 4:
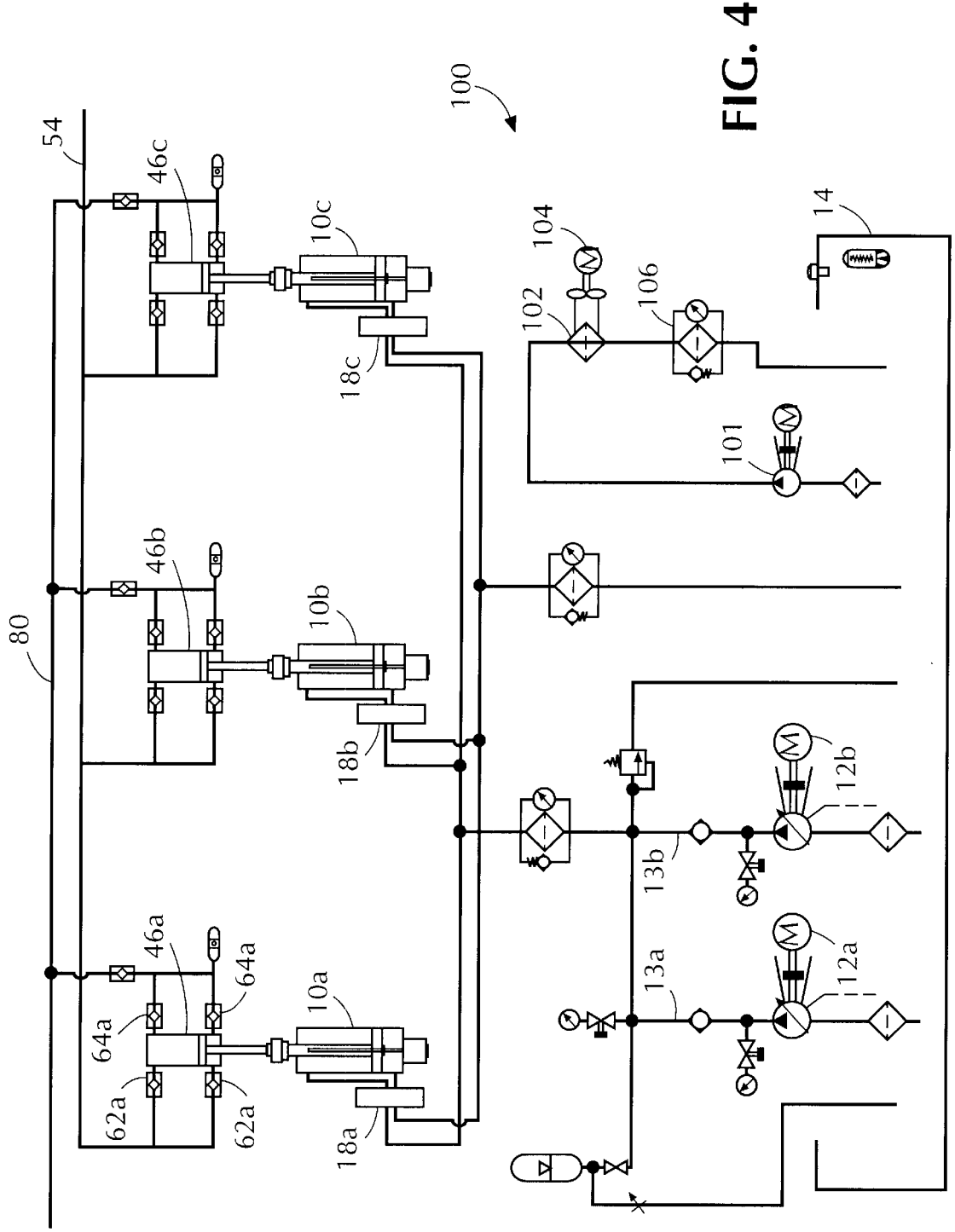
FIG. 4 is a schematic view of the present invention illustrating the use of a cooling/recirculating pump for cooling hydraulic oil stored in a hydraulic oil reservoir.

Use of several hydraulic oil pumps with the water pumps set according to the present invention may also be used in combination with a recirculating/cooling pump system 100 as shown in FIG. 4, so that heated oil returned to the reservoir may be cooled. Thus oil from the reservoir 14 is drawn by a pump 101 through a coil 102 where a fan 104 circulates cool air over the coil to cool the oil therein before it returns to the reservoir through a check value 106. Otherwise the system of FIG. 4 is the same as that of FIG. 3 except that it is shown in somewhat greater detail and uses two hydraulic pumps 12 and three sets of pistons, with like numerals representing like parts. In addition the three sets of pistons will preferably be operated 120° out of phase with each other.

The system of the present invention has numerous advantages. It allows use of commercially available reliable and low cost hydraulic oil pumps, reservoirs and coolers in all high speed moving systems using standard materials as de-ionized water is contained only in piping to and from water pumping cylinders and in the pumping cylinders themselves. The systems have a higher tolerance to heat buildup caused all by re-circulation through pressure relief valves.

Water pressure control is easier as only commercially standard oil pressure control methods (pressure relief, pump speed control, vane type pumps, unloading type pumps etc.) are required. Further, the system has the ability to create even higher water operating pressures that are required for improved water atomization with a simple change to cylinder bore ratios.

Using the system of the present invention monitoring of water flow rate can be done accurately and in a low cost manner without the use of complicated flow measurement apparatus, simply by monitoring the cylinder stroke rate or stroke time. This is important since flow rate must be measured in order to insure that atomizing nozzles have not plugged (causing a reduction in water flow and a loss of atomizing efficiency) or that integrity on the manifolds and atomizing heads are intact (a leak is indicated by an increase in flow rate above design). As the pumping cylinder is a positive displacement device, water flow is easily measured. In prior art devices, the flow is measured either through a flow measurement device which has a level of inaccuracy and must be composed of materials which are not subject to detrimental effects upon exposure to de-ionized water. In other systems water pump speed is adjusted in order to maintain the appropriate water flow and pressure. Pump wear and the resulting seal leaks will cause a discrepancy between the calculated flow rates based on pump speed and the actual flow rate.

Finally, with the present invention the water system is completely isolated from the motive oil by using joined cylinders and avoids inadvertent water contamination.

Other variations and modifications of this invention will be apparent to those skilled in this art after careful study of this application. This invention is not to be limited except as set forth in the following claims.

What is claimed is:

1. A high pressure water pump for supplying high pressure water for atomization in the inlet stream of a gas turbine engine comprising at least one hydraulic cylinder containing a piston secured to a piston rod extending from the hydraulic cylinder and defining within the hydraulic cylinder first and second hydraulic chambers on opposite sides thereof, means for selectively supplying oil under high pressure alternately to said hydraulic chambers while releasing oil from the opposite chamber thereby to reciprocate said piston rod, and at least one water cylinder including a housing and a piston therein secured to the piston rod for movement therewith and defining at least one fluid chamber in the cylinder on the side of thereof opposite the piston rod; and check valve means in fluid communication with said fluid chamber for allowing water to enter the chamber from a water source when the piston in the water cylinder is moved by the hydraulic cylinder in a direction which enlarges the volume of the fluid chamber and forces water from the fluid chamber at high pressure, while shutting off the supply of water to the chamber, when the piston in the water cylinder is moved by the hydraulic cylinder in a direction that decreases the volume of said fluid chamber.

2. The pump as defined in claim 1 wherein said means for supplying oil under high pressure composes a hydraulic oil pump and control valve means for alternating supply and release of oil to the opposing chambers of said hydraulic cylinder.

3. The pump as defined in claim 1 wherein said at least one hydraulic cylinder comprises at least two hydraulic cylinders each of which contains a piston secured to a separate piston rod extending from its associated hydraulic cylinder and defining first and second hydraulic chambers on opposite sides thereof, and said at least one water cylinder comprising at least a pair of water cylinders respectively associated with said hydraulic cylinders, each including a housing and a piston secured to the piston rod of its associated hydraulic cylinder for movement therewith.

4. The pump as defined in claim 3 wherein the pistons in said water cylinders each define at least one chamber in the cylinder on the side thereof opposite the piston and said means for supplying oil under high pressure includes control valve means for supplying high pressure oil alternatively and simultaneously to the first chamber of one of the hydraulic cylinders and the second chamber of the other hydraulic cylinder whereby the piston rods are reciprocated out of phrase with each other.

5. The pump as defined in claim 4 wherein said associated hydraulic and water cylinders are positioned in axial alignment.

6. The pump as defined in claim 5 wherein said water cylinders have two fluid chambers formed therein on opposite sides of the piston and said check valve means comprise pairs of check valves in fluid communication with each of said fluid chambers for alternatively allowing water to enter the chamber or be expelled there from under high pressure in response to the movement of the pistons in the water cylinders.

7. The pump as defined in claim 3 wherein the pistons in said water cylinders each define at least one chamber in the cylinder on the side thereof opposite the piston and said means for supplying oil under high pressure includes means for controlling the supply of oil to operate said hydraulic cylinders synchronously in a predetermined phase or velocity relationship.

8. A water pump for supplying high pressure water comprising at least one hydraulic cylinder including a piston defining within the hydraulic cylinder first and second hydraulic chamber on opposite sides thereof, means for selectively supplying oil under high pressure alternatively to said hydraulic chambers while releasing oil from the opposite chamber thereby to reciprocate said piston, and at least one water cylinder including a piston defining at least one fluid chamber in the water cylinder, means for connecting said pistons for simultaneous movement; and check valve means in fluid communication with said fluid chamber for allowing water to enter the chamber from a water source when the piston in the water cylinder is moved by the hydraulic cylinder in a direction which enlarges the volume of the fluid chamber and forces water from the fluid chamber at high pressure, while shutting off the supply of water to the chamber, when the piston in the water cylinder is moved by hydraulic cylinder in a direction that decreases the volume of said fluid chamber.

9. The pump as defined in claim 8 wherein said means for supplying oil under high pressure composes a hydraulic oil pump and control valve means for alternating supply and release of oil to the opposing chambers of said hydraulic cylinder.

10. The pump as defined in claim 8 wherein said at least one hydraulic cylinder comprises at least two hydraulic cylinders each of which contains a piston defining first and second hydraulic chambers on opposite sides thereof, and said at least one water cylinder comprising at least a pair of water cylinders respectively associated with said hydraulic cylinders, each including a housing and a piston therein.

11. The pump as defined in claim 10 wherein the pistons in said water cylinders each define at least one chamber in the water cylinder on the side thereof opposite the piston and said means for supplying oil under high pressure includes control valve means for supplying high pressure oil alternatively and simultaneously to the first chamber of one of the hydraulic cylinders and the second chamber of the other hydraulic cylinder whereby the piston rods are reciprocated out of phrase with each other.

12. The pump as defined in claim 10 wherein the pistons in said water cylinders each define at least one chamber in the cylinder on the side thereof opposite the piston and said means for supplying oil under high pressure includes means for controlling the supply of oil to operate said hydraulic cylinders synchronously in a predetermined phase or velocity relationship.

* * * * *